US012725300B2

(12) United States Patent
Woo et al.

(10) Patent No.: US 12,725,300 B2
(45) Date of Patent: Sep. 1, 2026

(54) INFRARED CAMERA-BASED METHOD AND SYSTEM FOR ESTIMATING HAND POSITION THROUGH DOMAIN TRANSFER LEARNING

(71) Applicant: Korea Advanced Institute of Science and Technology, Daejeon (KR)

(72) Inventors: Woontack Woo, Daejeon (KR); Gabyong Park, Daejeon (KR); Tae Kyun Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 652 days.

(21) Appl. No.: 18/259,615

(22) PCT Filed: Jan. 25, 2021

(86) PCT No.: PCT/KR2021/095031
§ 371 (c)(1),
(2) Date: Jan. 16, 2024

(87) PCT Pub. No.: WO2022/146109
PCT Pub. Date: Jul. 7, 2022

(65) Prior Publication Data

US 2024/0153133 A1 May 9, 2024

(30) Foreign Application Priority Data

Dec. 28, 2020 (KR) ........................ 10-2020-0184994

(51) Int. Cl.
*G06T 7/73* (2017.01)
*G06T 7/11* (2017.01)
(Continued)

(52) U.S. Cl.
CPC .................. *G06T 7/74* (2017.01); *G06T 7/11* (2017.01); *G06T 7/174* (2017.01); *G06T 7/248* (2017.01);
(Continued)

(58) Field of Classification Search
CPC ... G06T 7/74; G06T 7/11; G06T 7/174; G06T 7/248; G06T 2207/10028;
(Continued)

(56) References Cited

U.S. PATENT DOCUMENTS 9,412,013 B2 * 8/2016 Ryu ..................... H04N 23/611
9,734,435 B2 * 8/2017 Krupka .................. G06V 40/11
11,610,326 B2 * 3/2023 Lin ......................... G06T 9/002

FOREIGN PATENT DOCUMENTS

CN 102622591 8/2012
CN 110210320 9/2019
(Continued)

OTHER PUBLICATIONS

Park et al., "3D Hand Pose Estimation with a Single Infrared Camera via Domain Transfer Learning," 2020 IEEE International Symposium on Mixed and Augmented Reality (ISMAR), (2020), 13 pages.

(Continued)

*Primary Examiner* — Phuoc Tran
(74) *Attorney, Agent, or Firm* — CHRISTENSEN O'CONNOR JOHNSON KINDNESS PLLC

(57) ABSTRACT

The present invention relates to a hand position estimation method and system for estimating a 3-dimensional hand position for quick hand movement, on the basis of domain transfer learning from a depth image to an infrared image, the hand position estimation method comprising the steps of: processing a depth image and an infrared image for hand movement; synthesizing a depth map with the infrared
(Continued)

image by using a hand image generator (HIG), and estimating skeletal positions of hand joints from each of the depth map and an infrared map; and calculating a 3-dimensional hand position by using the skeletal positions and the center of a hand depth image.

12 Claims, 5 Drawing Sheets

(51) Int. Cl.
*G06T 7/174* (2017.01)
*G06T 7/246* (2017.01)

(52) U.S. Cl.
CPC ............... *G06T 2207/10028* (2013.01); *G06T 2207/10048* (2013.01); *G06T 2207/20081* (2013.01); *G06T 2207/30196* (2013.01)

(58) Field of Classification Search
CPC . G06T 2207/10048; G06T 2207/20081; G06T 2207/30196; G06T 2207/20084; G06T 7/73; G06T 7/593; G06V 40/107
See application file for complete search history.

(56) References Cited

FOREIGN PATENT DOCUMENTS

| | | |
|---|---|---|
| KR | 10-2017-0054673 | 6/2017 |
| KR | 10-2015-0111833 | 11/2017 |
| KR | 10-2016-0001699 | 6/2018 |

OTHER PUBLICATIONS

Rad et al., “Domain Transfer for 3D Pose Estimation from Color Images without Manual Annotations,” Institute for Computer Graphics and Vision, Graz University of Technology, Graz, Austria 2 Laboratoire Bordelais de Recherche en Informatique, Universit’e de Bordeaux, Bordeaux, France, (2019), 16 pages.
Kowdle et al, “The Need 4 Speed in Real-time Dense Visual Tracking,” ACM Transactions on Graphics, vol. 37, No. 6, Article 220. (2018), 14 pages.
Oberweger et al., “Hands Deep in Deep Learning for Hand Pose Estimation,” Institute for Computer Graphics and Vision Graz University of Technology, Austria, (2016), 10 pages.
International Search Report for International Application No. PCT/KR2021/095031, (International Filing Date: Jan. 25, 2021), mailed Sep. 16, 2021 (6 pages).

* cited by examiner

FIG. 2

INFRARED CAMERA-BASED METHOD AND SYSTEM FOR ESTIMATING HAND POSITION THROUGH DOMAIN TRANSFER LEARNING

TECHNICAL FIELD

The present invention relates to a method and system for estimating a hand pose based on an infrared (IR) camera through domain transfer learning and, more particularly, to technology for estimating a three-dimensional (3D) hand pose for a fast hand motion based on domain transfer learning from a depth image to an IR image.

RELATED ART

Articulated hand pose estimation is an actively studied issue in the field of computer vision (CV), augmented reality (AR), and virtual reality (VR). The technique is essential for various applications using a hand-based interaction, such as a sign language, a remote collaboration, a system control, and a manipulation of virtual objects, etc. In such applications, a fast hand motion frequently occurs when a user intends to quickly execute a task. However, in fast motion, typical inputs for vision-based solutions, RGB and depth images, are severely contaminated by image artifacts, that is, motion blur. Under the motion blur, the state-of-the-art methods using RGB or depth inputs yield an inaccurate hand pose estimation. Therefore, a 3D hand pose estimation under the fast hand motion is crucial.

There are largely two categories of methods to estimate a 3D hand pose in the art, that is, a generative approach and a discriminative approach. The generative approach tracks a 3D hand articulation as an optimization problem to fit a virtual 3D hand model to a depth image. Since it is assumed that a hand motion is smooth and slow with temporal continuity, the generative approach usually fails in tracking a fast hand motion. Depth image input contaminated by the fast hand motion is a big hindrance and applying motion blur to a virtual hand model is very challenging.

The discriminative approach may estimate a 3D hand pose in a single frame using a classifier/regressor trained on pairs of hand images and skeleton labels. Although the discriminative approach does not rely on temporal continuity, the discriminative approach is still affected by motion blur if a training dataset does not include blurry images. Existing hand pose datasets do not include blurry cases. Although the blurry images are included in the training dataset, pose ambiguity is large since some joints disappear from the depth image input due to motion blur.

On the contrary, a hybrid approach combines advantages of the aforementioned generative method and discriminative method. The hybrid approach may track a hand articulation without the assumption of temporal continuity, but may not be a solution in the case of motion blur since the existing generative and discriminative approaches are prone to motion blur.

To solve the issues found in the aforementioned methods, there are some possible alternatives, such as a deblurring method or a sensor-fusion method for 3D hand pose estimation in presence of motion blur. Although an RGB-based deblurring-related method deblurs a real object in a contaminated RGB scene in real time, an application domain is not a fast articulated hand motion. In addition, the same method may not be applied to a depth image since a mechanism of motion blur in RGB frames is quite different from that in depth frames. Also, the existing depth-based deblurring method is limited to a specific multi-tap Time of Flight (ToF) camera that needs to be accessible to an internal signal from each tap.

Currently, proposed is technology for tracking a 3D hand pose in presence of motion blur and the technology combines a gyroscope attached to a hand and a depth camera. Since the gyroscope does not suffer from motion blur, the sensor-fusion approach handles the presence of motion blur. However, the sensor-fusion approach processed the limited motion blur case only by a fast hand rotation rather than a general motion. Additionally, it is inconvenient for users to wear a gyro sensor.

To avoid a motion blur issue for 3D hand pose estimation, the present invention exploits the following observation. An infrared (IR) image from an IR camera that uses a coded-light technique less suffers from motion blur, whereas a corresponding depth image is severely distorted by a fast motion. According to the existing study, this observation is likely to be valid since the IR image is obtained from a single emitted pattern while depth information is obtained from multiple emitted patterns. Therefore, the IR image is weakly blurred under fast hand motion. However, it is expensive to annotate a 3D hand skeleton in the IR image. Also, there is no existing dataset of IR images with hand joint labels. An external sensor may not be used for annotations due to a change in hand appearance. Also, unlike rendering a synthetic depth image, generating a synthetic IR hand image in which the 3D hand skeleton is given is nontrivial since material properties, texture, and light source are required for a realistic IR hand image, and yet has a real-synthetic domain-gap. Similarly, self-supervised learning using differentiable rendering is inappropriate for a goal since a rendering model does not take blurring into account.

DETAILED DESCRIPTION

Technical Subject

An objective of the present invention is to perform a successful three-dimensional (3D) hand pose estimation even for a fast hand motion by using paired infrared (IR) and depth images captured from an IR camera based on domain transfer learning.

Technical Solution

A hand pose estimation method based on an infrared (IR) camera through domain transfer learning according to an example embodiment of the present invention includes processing a depth image and an IR image for a hand motion; synthesizing a depth image from the IR image using a hand image generator (HIG); estimating a skeletal position of a hand joint in each of the depth map and the IR map; and calculating a three-dimensional (3D) hand pose using the skeletal position and a center of a hand depth image.

A hand pose estimation system based on an IR camera through domain transfer learning according to an example embodiment of the present invention includes an image processing configured to process a depth image and an IR image for a hand motion; a skeleton estimator configured to synthesize a depth image from the IR image using a hand image generator (HIG) and to estimate a skeletal position of a hand joint in each of the depth map and the IR map; and a pose calculator configured to calculate a 3D hand pose using the skeletal position and a center of a hand depth image.

Effect

According to example embodiments of the present invention, it is possible to perform a successful three-dimensional (3D) hand pose estimation even for a fast hand motion by using paired infrared (IR) and depth images captured from an IR camera based on domain transfer learning.

Also, according to example embodiments of the present invention, there is provided a new discriminative method for estimating a 3D hand skeleton in a single IR image and it is possible to minimize inaccurate estimation due to motion blur by a fast hand motion by training a hand pose estimator (HPE) that estimates a skeletal position of a hand joint.

BRIEF DESCRIPTION OF DRAWINGS

FIG. 2 illustrates an example of estimating a 3D hand pose with a single infrared (IR) camera according to an example embodiment of the present invention.

BEST MODE

Figure 1:
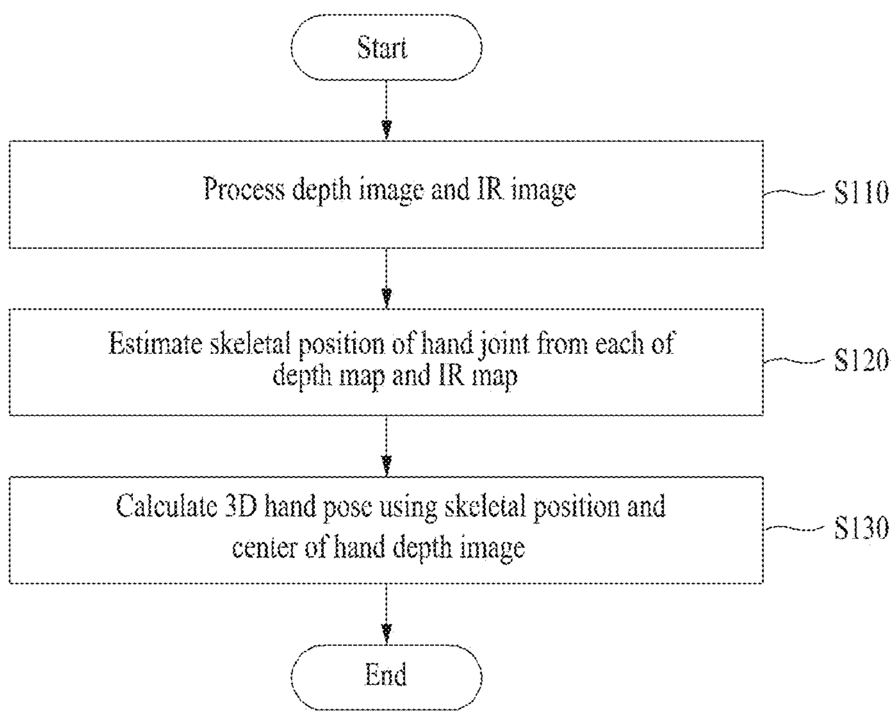
FIG. 1 is a flowchart illustrating a hand pose estimation method according to an example embodiment of the present invention.

Advantages and features of the present invention and methods to achieve the same may become clear with reference to the accompanying drawings and the following example embodiments. However, the present invention is not limited to the following example embodiments and may be embodied in various different forms. Rather, the example embodiments are provided as examples so that the present invention will be thorough and complete, and to fully inform one of ordinary skill in the art to which the present invention pertains of the scope of the present invention and the present invention is defined by the scope of the claims.

The terms used herein are to describe the example embodiments and not to limit the present invention. As used herein, the singular forms "a," "an," and "the," are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and elements.

Unless otherwise defined, all terms (including technical and scientific terms) used herein have the same meaning as commonly understood by one of ordinary skill in the art to which the present invention pertains. Also, terms, such as those defined in commonly used dictionaries, should not be interpreted in an idealized or overly formal sense unless expressly so defined herein.

Hereinafter, the example embodiments of the present invention will be described in more detail with reference to the accompanying drawings. Like reference numerals refer to like elements throughout and further description related thereto is omitted.

The example embodiments of the present invention utilize paired infrared (IR) and depth images captured from an IR camera based on self-supervised domain transfer learning, guided by an existing hand pose estimator (HPE) previously trained from paired depth image and hand skeleton position entries in BigHand2.2M dataset.

Although a ground-truth skeletal position in the IR image is not available, a skeletal position predicted in the depth image may be used. In detail, in a branch of an architecture proposed herein, input of the IR image generates a depth map that is trained from the paired depth image and IR image. Subsequently, a hand pose estimator (HPE) given the generated depth map estimates a 3D hand skeleton position, which is trained from a result of the existing hand pose estimator given a real depth map.

Similarly, in a different branch, another hand pose estimator given an IR map is trained through self-supervision from output of the existing hand pose estimator given the depth map to generate a hand skeleton position.

Therefore, the proposed present invention successfully estimates a 3D hand pose when the existing depth-based hand pose estimator provides an inaccurate estimation due to motion blur. The proposed present invention is evaluated quantitatively and qualitatively using a publicly available dataset and a new challenging dataset.

Hereinafter, the present invention is described in detail with reference to FIGS. 1 to 5.

FIG. 1 is a flowchart illustrating a hand pose estimation method according to an example embodiment of the present invention.

Figure 5:
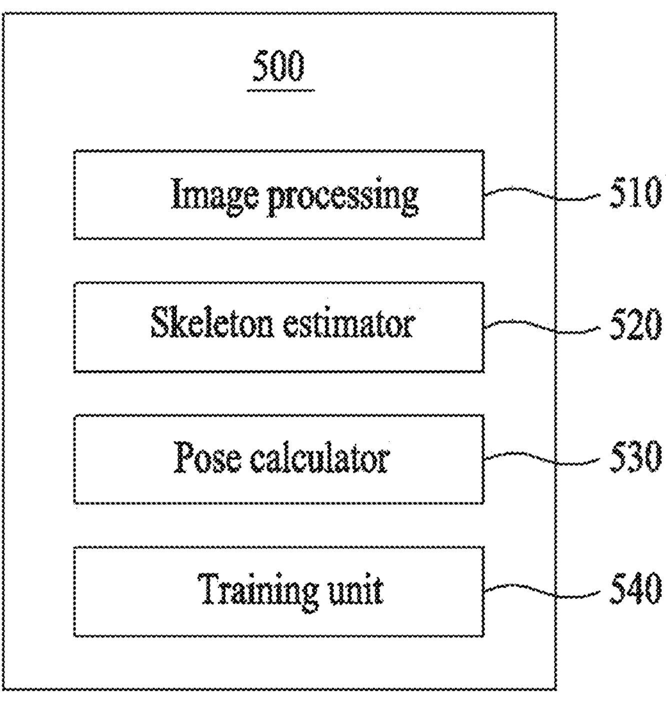
FIG. 5 is a diagram illustrating a detailed configuration of a hand pose estimation system according to an example embodiment of the present invention.

The method of FIG. 1 is performed by a hand pose estimation system according to an example embodiment of the present invention illustrated in FIG. 5. The hand pose estimation method according to an example embodiment of the present invention may train a 3D hand skeleton position when inputting a depth image and an IR image. Hereinafter, features of the present invention are described.

Referring to FIG. 1, in operation S110, a depth image and an IR image for hand motion are processed.

Operation S110 may segment a hand image from a 3D bounding box centered on a center of mass (CoM) estimated in the depth image being input, may normalize a depth patch, and may normalize the IR image using the 3D bounding box.

In detail, the present invention may preprocess the depth image and the IR image to segment a hand object as foreground. Here, it is assumed that the hand is a closest object to a camera within the range of a distance (0-50 cm). Initially, operation S110 estimates the CoM in the depth image. Then, operation S110 segments the hand image from the 3D bounding box, resizes the same to 128×128, and then normalizes the depth patch to [−1,1]. Subsequently, for the IR image, operation S110 employs GrabCut algorithm that is initialized for foreground/background probable foreground/background regions using the 3D bounding box obtained from the depth image. In particular, operation S110 initializes pixels corresponding to the segmented depth image as the probable foreground or as the probable background. Then, operation S110 initializes the pixels outside the 3D bounding box or beyond a maximum distance (50 cm) as the background. Finally, the segmented IR image is cropped from the same 3D bounding box and normalized to [−1,1].

In operation S120, a depth map is synthesized from the IR image and a skeletal position of a hand joint is estimated from each of the depth map and an IR map.

Operation S120 synthesizes the depth map ($x_d \in X_d$) from the IR image ($x_i \in X_{ir}$) using a hand image generator (HIG)

($f^G$:$X_{ir}$→$X_d$). Also, operation S120 may construct two hand pose estimators (HPEs) given input of the depth image and input of the IR image, respectively. Here, the two hand pose estimators include a depth hand pose estimator and an IR hand pose estimator. Operation S120 may infer the skeletal position of the hand joint from the depth map using the depth hand pose estimator (HPE $f^{E1}$) and may estimate the skeletal position of the hand joint from the IR map using the IR hand pose estimator (HPE $f^{E2}$).

In operation S130, a 3D hand pose is calculated using the skeletal position and a center of a hand depth image.

Operation S130 may estimate the 3D hand pose using the center of the hand depth image and the skeletal positions estimated through the depth hand pose estimator (HPE $f^{E1}$) and the IR hand pose estimator (HPE $f^{E2}$).

Figure 2:
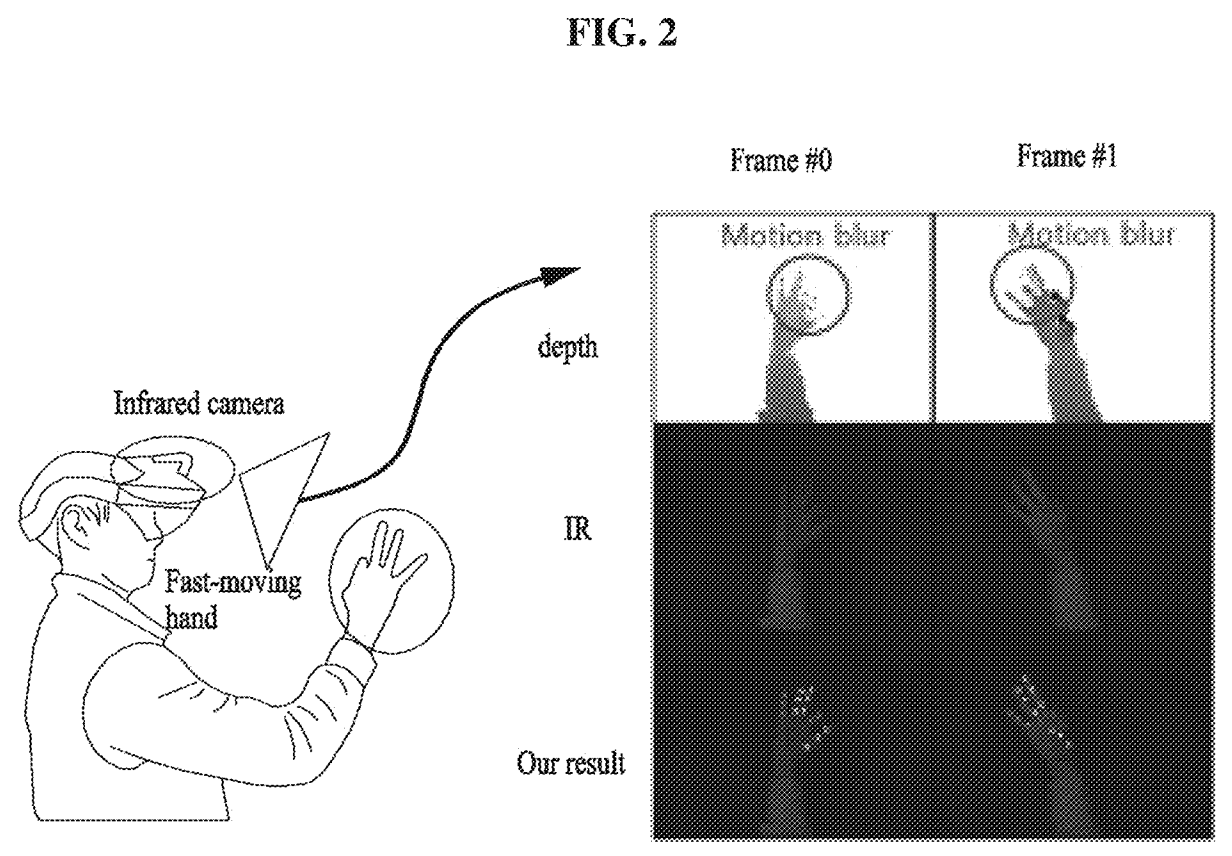

Operation S130 may calculate the 3D hand pose from international coordinates using weight center of the hand depth image and may minimize blurry cases in the depth map as illustrated in FIG. 2 by training the depth hand pose estimator (HPE $f^{E1}$) and the IR hand pose estimator (HPE $f^{E2}$).

The hand pose estimation method according to an example embodiment of the present invention may estimate a relative hand skeleton position from the center of the hand in operation 120. Here, the present invention may estimate a 63-dimensional hand skeleton position in a 52-dimensional space, that is, a low dimensional space through reduction to 52 dimensions. Subsequently, operation S13 may reconstruct values mapped to the 52 dimensions estimated in operation S120 to 63 dimensions corresponding to an original dimension and may use the center of the hand depth image from the camera to obtain the hand skeleton position from a camera coordinate system.

The hand pose estimation method according to an example embodiment of the present invention may further include training a hand image generator (HIG), a hand image discriminator (HID), and two hand pose estimators (HPEs) using a dataset that includes the paired depth and IR images from the IR camera.

The present invention applies output of the existing hand point estimator (HPE) for consistency loss to train a network. To this end, the present invention trains the existing HPE $f^{E0}$ through supervision training for paired depth and hand skeleton items. Subsequently, all of the HIG $f^G$ and the first HPE $f^{E1}$ in the branch and the second HPE $f^{E2}$ in another branch are trained. Training is performed using a corresponding non-blurry depth map and estimate of the HPE $f^{E0}$ under self-supervision and training of each branch is performed using an end-to-end method. Also, the present invention refines the second HPE $F^{E2}$ using a weakly blurry IR image. The aforementioned training process is further described below with reference to FIG. 3.

The hand pose estimation method according to an example embodiment of the present invention utilizes two types of datasets (BigHand2.2M dataset and DepthIrHand dataset) to train the network. The BigHand2.2M dataset is a largest dataset with 2.2 million depth images and corresponding 3D skeletal positions. Many previous works achieved successful performance to estimate a 3D skeletal position in a single depth frame by training the network on the dataset. However, since a burry depth image is not included in the dataset, accuracy considerably drops for a fast hand motion. Although the blurry depth image is included, pose ambiguity may be profound since some joints in the depth image are invisible due to motion blur. To complement this, the present invention constructs the DepthIrHand dataset including paired depth and IR images from a single IR camera. A training sample in the BigHand2.2M dataset is denoted as depth image xd0 and corresponding 3D skeletal position and other training samples in the DepthIrHand data set are denoted as paired non-blurry depth and IR images ($x_{d1}$, $x_{ir1}$) and weakly blurred IR image $x_{ir2}$. Therefore, the present invention collects a training set by dividing individually non-blurry and blurry cases according to qualitative speed of a hand motion.

Here, the hand pose estimation method according to an example embodiment of the present invention follows a skeletal model used in the BigHand2.2M dataset. It includes 21 positions: one for wrist and four for each finger. A fingertip (TIP) and three joints (DIP, PIP, and MCP) are modeled for each finger and each joint position is represented as a 3D vector. Therefore, a 63D vector may be inferred for skeletal positions.

FIG. 2 illustrates an example of estimating a 3D hand pose with a single IR camera according to an example embodiment of the present invention.

Referring to FIG. 2, an IR camera worn by a user captures a fast-moving hand of a user. As a result, it can be seen that depth images (depth) are contaminated due to motion blur by fast hand motion, while IR images (IR) are weakly blurred. Therefore, a hand pose estimation system according to an example embodiment of the present invention may more accurately estimate a 3D hand pose through hand skeleton extraction using the depth images and the IR images.

Figure 3:
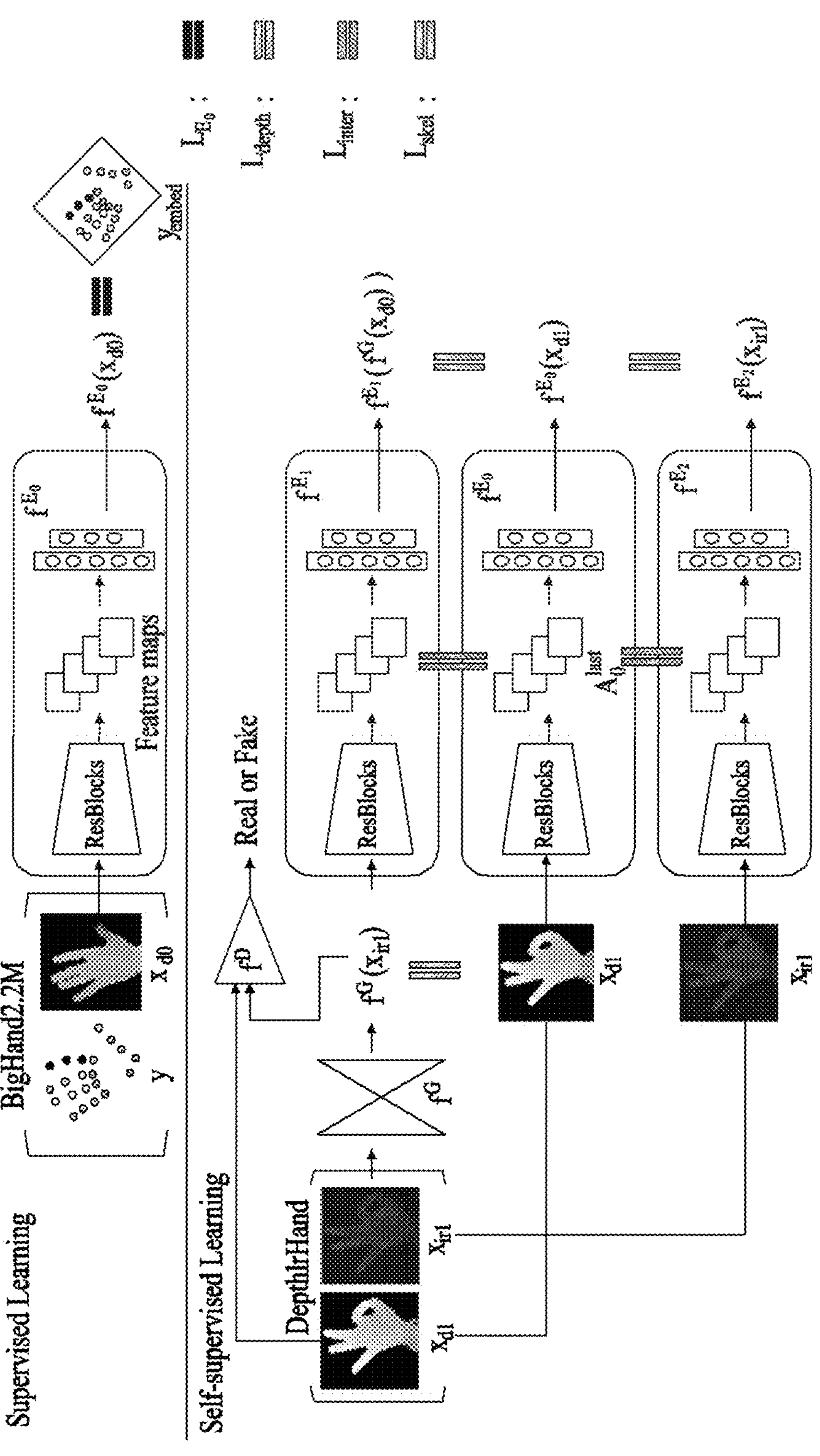
FIG. 3 illustrates a training diagram for training a network according to an example embodiment of the present invention.

FIG. 3 illustrates a training diagram for training a network according to an example embodiment of the present invention.

Referring to FIG. 3, a hand image generator (HIG $f^G$) synthesizes a depth image ($x_d$) given an input IR image ($x_{ir}$). To train the network, the present invention uses a single pair of non-blurry depth and IR images with a slow hand motion. The trained hand image generator (HIG $f^G$) serves to synthesize the non-blurry depth image when the depth image is blurred by a fast hand motion. To train this, a generative adversarial network (GAN) architecture is employed.

A hand image discriminator (HID $f^D$) classifies whether a synthesized depth map conforms to a human hand depth map, which helps the hand image generator (HIG fc) to synthesize a more realistic depth map.

In FIG. 3, HPE $f^{E0}$ (HPE #0) estimates a hand skeleton position given an input depth image. A real depth sensor receives a preprocessed depth map and HPE #0 is trained for the BigHand2.2M dataset. Also, HPE #0 trains the network to learn a low-dimensional representation of training data using a low-dimensional embedding layer. Embedding is set as 52 dimensions lower than an original dimension (63 dimensions). In testing, the low-dimensional representation is reconstructed to 63-dimensional hand skeleton positions.

Also, in FIG. 3, HPE $f^{E1}$ (depth hand pose estimator, HPE #1) estimates a hand skeleton position given an input depth image. However, in contrast to HPE #0, HPE #1 accepts the synthesized depth map by the hand image generator (HIG). The depth hand pose estimator is initialized from the previously trained HPE #0. The present invention tried to freeze parameters of the depth hand pose estimator to the same depth of the trained HPE #0 to train all of the hand image generator and the depth hand pose estimator. However, since a result of training without freezing the parameters exhibited improved accuracy, the depth hand pose estimator is refined simultaneously with training of the hand image generator.

Also, in FIG. 3, HPE $f^{E2}$ (IR hand pose estimator, HPE #2) estimates a hand skeleton position given an input IR image. HPE #2 accepts an IR map preprocessed with a mask using the GrabCut algorithm in which an initial seed is obtained from the 3D bounding box generated through preprocessing of the depth image. A network architecture of the IR hand pose estimator is the same as that of HPE #0. The present invention initializes the IR hand pose estimator ($f^{E2}$) from the previously trained HPE #0. Subsequently, the present invention trains the network based on the DepthIrHand dataset. Since the dataset does not include the hand skeleton position as ground truth, the present invention employs a self-supervised training method for domain transfer learning. Here, the present invention fully relies on a result of the previously trained HPE #0 for a first training stage. For refinement, the present invention selectively follows a result of another branch according to a blurry or non-blurry case.

Hereinafter, a method of improving all of transfer learning on a non-blurry dataset and transfer learning on a blurry dataset is described.

Transfer Learning on Non-Blurry Dataset

As illustrated in FIG. 3, the present invention trains a hand image generator (HIG), a hand image discriminator (HID), and hand pose estimators (HPEs) on the DepthIrHand dataset. Since there is no ground-truth skeletal joint in the dataset, the present invention uses consistency loss from HPE #0 trained on the BigHand2.2M dataset including depth and skeletal entries. Therefore, the present invention uses only data pair ($x_{d1}$, $x_{ir1}$) for training since HPE #0 performs well only on the non-blurry depth image. Given the input data pair ($x_{d1}$, $x_{ir1}$), the present invention constructs three branches to train the same.

For example, the three branches include a first branch to train the HIG, the HID, and the HPE $F^{E1}$, a second branch to train the HPE $f^{E2}$, and a third branch to predict a 3D joint position for self-supervision.

Prior to the aforementioned training, the present invention trains HPE #0 through supervised learning with a depth image pair and a corresponding hand skeleton position from the BigHand2.2M dataset. Loss $L_{E0}$ for $f^{E0}$ is defined as Equation 1 as follows:

$$L_{E0} = \left\| f^{E_0}(x_{d0}) - y_{embed} \right\|^2 \quad \text{[Equation 1]}$$

Here, $y_{embed}$ denotes a lower dimensional vector in an embedding space mapped from an original dimensional vector.

In the first branch, the present invention performs end-to-end training of the HIG, the HID, and the HPE $f^{E1}$ on the DepthIrHand dataset. Training relies on a result of well-trained HPE #0 and a corresponding depth map. To this end, a loss function is defined as follows:

$$L_{G,D,E_1} = L_{depth} + \lambda_0 L_{inter} + \lambda_1 L_{skel} \quad \text{[Equation 2]}$$

Here, $\lambda_0$ and $\lambda_1$ denote fixed weight parameters.

$L_{depth}$ calculates a discrepancy between a synthesized depth map and a preprocessed depth map from an actual sensor. Therefore, the present invention employs Pix2pix-Net with a pair of depth and IR images in the DepthIrHand dataset.

The hand image generator ($f^G$) is trained to synthesize the hand depth image by minimizing the loss $L_{depth}$. Also, the hand image discriminator ($f^D$) is trained to distinguish the synthesized depth map from a real depth map. Here, the loss $L_{depth}$ is defined as Equation 3 as follows.

$$L_{depth} = \lambda_2 E_{x_{ir1},x_{d1}}\left[\log f^D(x_{ir1}, x_{d1})\right] + \lambda_3 E_{x_{ir1},}\left[1 - \left(\log f^D\left(x_{ir1}, f^G x_{d1}\right)\right)\right] + \lambda_4 E_{x_{ir1},x_{d1}}\left[\left\| f^G(x_{ir1}) - x_{d1} \right\|_1\right] \quad \text{[Equation 3]}$$

Here, $\lambda_2$, $\lambda_3$, and $\lambda_4$ denote fixed weight parameters.

$L_{inter}$ is used for an activation of an intermediate layer of HPE #1 to match an activation of a corresponding layer of HPE #0. Here, since the employed HPE includes a feature extractor with a convolutional layer and a pose estimator with a fully-connected layer, the present invention applies an intermediate loss to a last convolutional layer of the feature extractor.

Here, the intermediate loss function is defined as follows:

$$L_{inter} = E_{x_{ir1},x_{d1}}\left\| A^{last}\left(f^G(x_{ir1})\right) - A_0^{last}(x_{d1}) \right\|_1 \quad \text{[Equation 4]}$$

Here, $A^{last}$ and $$A_0^{last}$$

denote last layer activations for the HPE #1 from the synthesized depth map and the pretrained HPE #0 from the real depth map, respectively.

$L_{skel}$ is used for skeletal consistency loss from the pretrained HPE #0 since the DepthIrHand dataset does not include labels of skeletal joints as ground truth. Here, the skeleton loss function is defined as follows:

$$L_{skel} = E_{x_{ir1},x_{d1}}\left\| f^{E_1} f^G(x_{ir1}) - f^{E_0}(x_{d1}) \right\|^2 \quad \text{[Equation 5]}$$

In the second branch, the present invention trains HPE #2 using output from the pretrained HPE #0. In detail, the present invention uses an intermediate output and a last prediction value from the pretrained HPE #0. To this end, the loss function is defined as follows:

$$L_{E_2} = \lambda_5 L_{inter} + \lambda_6 L_{skel} \quad \text{[Equation 6]}$$

Here, $\lambda_5$ and $\lambda_6$ denote fixed weight parameters.

$L_{inter}$ serves similarly as in Equation 4, matching a corresponding activation of the pretrained HPE #0 and an intermediate activation of HPE #2. $L_{skel}$ is used for output of HPE #2 to follow HPE #0 skeletal pose in an embedded space. The loss function is defined as follows:

$$L_{skel} = E_{x_{ir1},x_{d1}}\left\| f^{E_2}(x_{ir1}) - f^{E_0}(x_{d1}) \right\|^2 \quad \text{[Equation 7]}$$

Here, training of HPE $f^{E2}$ is performed similarly when training HPE $f^{E1}$.

Refinement on Blurry Dataset and Non-Blurry Dataset

[Algorithm1]
Algorithm 1 Process of refining HPE#2

Input: Trained network parameters of $f^{E_0}$, $f^G$, $f^{E_1}$ and $f^{E_2}$; Depth map and IR map pairs $S = \{(x_{d1}^{(i)}, x_{ir1}^{(i)})\}_{i=1}^{u}$ for non-blurry case; IR maps $B = \{(x_{ir2}^{(i)})\}_{i=1}^{m}$ for blurry case; The number 1 of epochs and the batch size N; Hyper-parameter;
Ouput: HPE#2 $f^{E_2}$.

- for each epoch t = 1 to T do
  - for each batch n = 1 to N do
    - $D \leftarrow \{SUB\}_{i=n}$
    - if $D \subset S$ then
      - //Refinement of $f^{E_2}$ on non-blurry dataset S.
      - Evaluate $f^{E_2}$ and $f^{E_0}$ on D.
      - Set $\lambda_7 = 10$, $\lambda_8 = 0$ in Eq. 8.
      - Evaluate its gradients $\nabla f^{E_2}$.
      - Update $f^{E_2}$
    - else if $D \subset B$ then
      - //Refinement of $f^{E_2}$ on blurry dataset B
      - Evaluate $f^{E_2}$ and $f^{E_1}$ ($f^G$) on D.
      - Set $\lambda_7 = 0$, $\lambda_8 = 0$ in Eq. 8.
      - Evaluate its gradients $\nabla f^{E_2}$.
      - Update $f^{E_2}$.
    - end if
  - end for
- end for As shown in Algorithm 1, the present invention refines the HPE $f^{E2}$ on both the blurry dataset and the non-blurry dataset.

In a preliminary experiment, since $f^G$ synthesizes a non-blurry depth image from a blurry depth image, accuracy of HPE #1 given the synthesized depth map by $f^G$ was superior to HPE #2 in the case of fast hand motion. In slow motion, HPE #0 given a real depth map demonstrated highest accuracy. Therefore, HPE #2 may be refined through supervision from a different target. A loss function may be selectively defined to follow output according to a dataset (blurry or non-blurry). In this stage, parameters of $f^{E0}$, $f^{E1}$, and $f^G$ are frozen.

Clean data pair $(x_{d1}, x_{ir1})$ and weakly-blurred IR image $x_{ir2}$ are used to refine $f^{E2}$. In detail, the present invention forces HPE #2 to follow the estimate of HPE #0 given the real depth map in a case without motion blur. However, in presence of motion blur, the estimate of HPE #0 given an original depth map is supervised poorly. Therefore, in a blurry case, the estimate of HPE #1 given the synthesized depth map is followed. Here, a loss function for self-supervision is defined as follows:

$$L_{E_2}^{refined} = b_0\lambda_7 E_{x_{ir1},x_{d1}}\left[\left\|f^{E_2}(x_{ir1}) - f^{E_0}(x_{d1})\right\|^2\right] + b_1\lambda_7 E_{x_{ir2}}\left[\left\|f^{E_2}(x_{ir2}) - f^{E_1} f^{G}(x_{ir2})\right\|^2\right] \quad \text{[Equation 8]}$$

Here, $b_0=1$ and $b_1=0$ are set for non-blurry sample set $(x_{ir1}, x_{d1})$ and $b_0=0$ and $b_1=1$ are set for blurred IR sample $x_{ir2}$.

Figure 4:
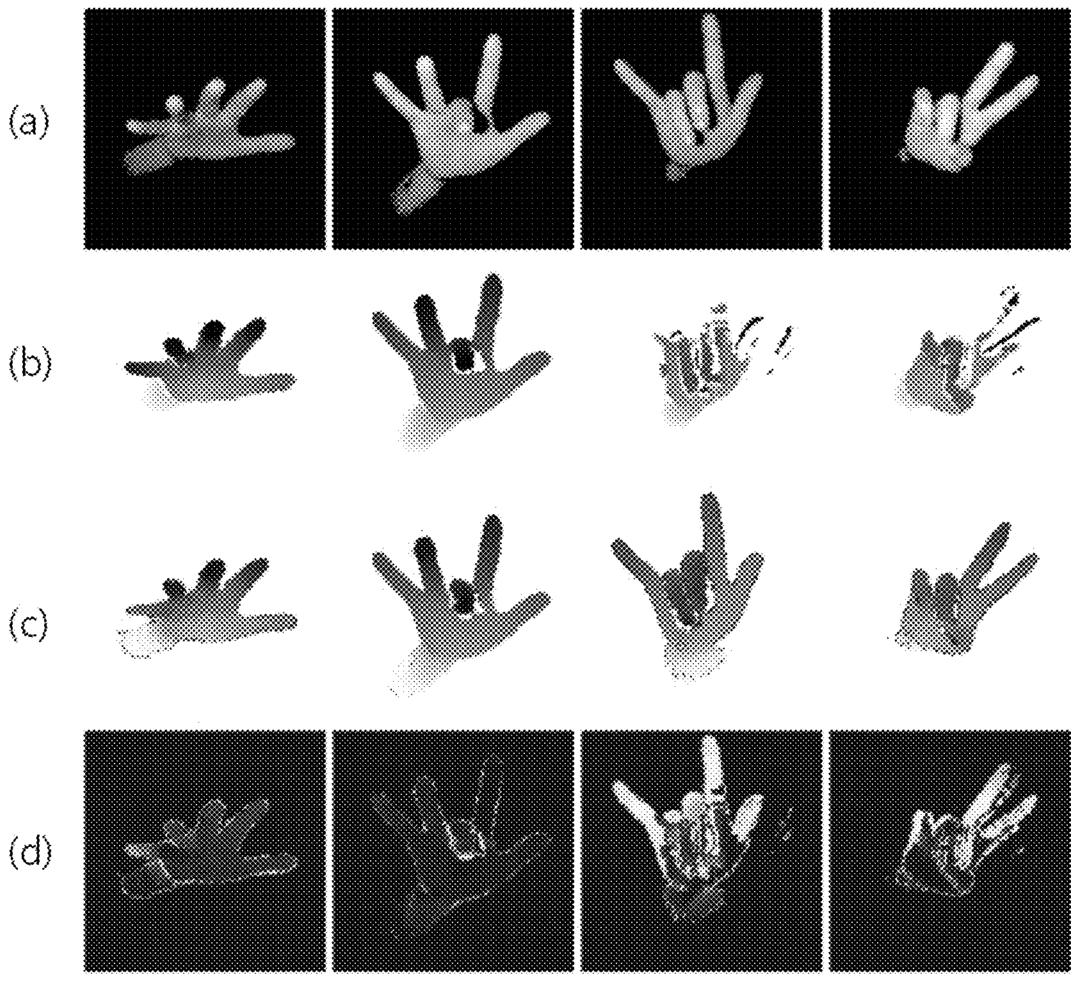
FIG. 4 illustrates an example of a sample generated by a hand image generator according to an example embodiment.

FIG. 4 illustrates an example of a sample generated by a hand image generator according to an example embodiment.

In more detail, (a) of FIG. 4 illustrates real IR images and (b) of FIG. 4 illustrates real depth images. Also, (c) of FIG. 4 illustrate depth images synthesized by the hand image generator (HIG), and (d) of FIG. 4 illustrates color-coded, pixel-wise error between depth images.

Referring to FIG. 4, in the case of first and second columns that demonstrate a slow motion, it can be seen that a largest discrepancy is shown near the outline of a hand due to sensor noise. Also, in the case of third and fourth columns that demonstrate a fast motion, it can be seen that a largest discrepancy is shown in the depth images ((b) of FIG. 4) that are contaminated due to motion blur. To solve this issue, as illustrated in the third and fourth columns of (c) of FIG. 4, it can be seen that the hand image generator (HIG) synthesizes a depth map from an IR map, which is effective in motion blur of the depth image.

FIG. 5 is a block diagram illustrating a detailed configuration of a hand pose estimation system according to an example embodiment of the present invention.

Referring to FIG. 5, the hand pose estimation system according to an example embodiment of the present invention estimates a 3D hand pose for a fast hand motion based on domain transfer learning from a depth image to an IR image.

To this end, a hand pose estimation system 500 according to an example embodiment of the present invention includes an image processing 510, a skeleton estimator 520, a pose calculator 530, and a training unit 540.

The image processing 510 processes a depth image and an IR image for a hand motion.

The image processing 510 may segment a hand image from a 3D bounding box centered on a center of mass (CoM) estimated in the depth image being input, may normalize a depth patch, and may normalize the IR image using the 3D bounding box.

The skeleton estimator 520 synthesizes the depth map from the IR image and estimates a skeletal position of a hand joint from each of the depth map and an IR map.

The skeleton estimator 520 synthesizes the depth map $(x_d \in X_d)$ from the IR image $(x_{ir} \in X_{ir})$ using the hand image generator (HIG, $f^G$: $X_{ir} \rightarrow X_d$). Also, the skeleton estimator 520 may construct two hand pose estimators (HPEs) given input of the depth map and input of the IR image, respectively. Here, the two hand pose estimators include a depth hand pose estimator and an IR hand pose estimator. The skeleton estimator 520 may infer the skeletal position of the hand joint from the depth map using the depth hand pose estimator (HPE $f^{E1}$) and may estimate the skeletal position of the hand joint from the IR map using the IR hand pose estimator (HPE $f^{E2}$).

The pose calculator 530 calculates a 3D hand pose using the skeletal position and a center of a hand depth image.

The pose calculator 530 may calculate the 3D hand pose using the center of the hand depth image and the skeletal positions estimated using the depth hand pose estimator (HPE $f^{E1}$) and the IR hand pose estimator (HPE $f^{E2}$).

The pose calculator 530 may calculate the 3D hand pose from international coordinates using weight center of the hand depth image and may minimize blurry cases in the depth map as illustrated in FIG. 2 by training the depth hand pose estimator (HPE $f^{E1}$) and the IR hand pose estimator (HPE $f^{E2}$).

The hand pose estimation system 500 according to an example embodiment of the present invention may estimate a relative hand skeleton position from the center of the hand using the skeleton estimator 520. Here, the present invention may estimate a 63-dimensional hand skeleton position in a 52-dimensional space, that is, a low dimensional space through reduction to 52 dimensions. Subsequently, the pose calculator 530 may reconstruct values mapped to the 52 dimensions estimated by the skeleton estimator 520 to 63 dimensions corresponding to an original dimension and may use the center of the hand depth image from the camera to obtain the hand skeleton position from a camera coordinate system.

The training unit 540 may train a hand image generator (HIG), a hand image discriminator (HID), and two hand pose estimators (HPEs) using a dataset that includes the paired depth and IR images from the IR camera.

Although corresponding description is omitted in the system of FIG. 5 of the present invention, it will be apparent to one of ordinary skill in the art that components that constitute the system of the present invention may include all the contents described above with reference to FIGS. 1 to 4.

The systems or the apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporarily embodied in any type of machine, component, physical equipment, virtual equipment, computer storage medium or device, or a signal wave to be transmitted, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both a machine code, such as produced by a compiler, and files containing higher level code that may be executed by the computer using an interpreter. The hardware device may be configured to operate as one or more software modules to perform operations of the example embodiments, or vice versa.

While the example embodiments are described with reference to specific example embodiments and drawings, it will be apparent to one of ordinary skill in the art that various changes and modifications in form and details may be made in these example embodiments from the description. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A hand pose estimation method based on an infrared (IR) camera through domain transfer learning, the hand pose estimation method comprising:

processing a depth image and an IR image for a hand motion;

synthesizing a depth map in the IR image using a hand image generator (HIG) and estimating a skeletal position of a hand joint from each of the depth map and an IR map; and calculating a three-dimensional (3D) hand pose using the skeletal position and a center of a hand depth image.

2. The hand pose estimation method of claim 1, wherein the processing comprises segmenting a hand image in a three-dimensional (3D) bounding box centered on a center of mass (CoM) estimated in the depth image being input, normalizing a depth patch, and normalizing the IR image using the 3D bounding box.

3. The hand pose estimation method of claim 1, wherein the estimating comprises estimating a relative skeletal position of the hand joint from a center of a hand in a space of 52 dimensions corresponding to a low dimension, and the calculating comprises reconstructing values mapped to the 52 dimensions estimated in the estimating to 63 dimensions and using the center of the hand depth image from a camera coordinate system.

4. The hand pose estimation method of claim 3, wherein the estimating comprises inferring the skeletal position of the hand joint from the depth map using a depth hand pose estimator (HPE $f^{E1}$) and estimating the skeletal position of the hand joint from the IR map using an IR hand pose estimator (HPE $F^{E2}$).

5. The hand pose estimation method of claim 4, wherein the calculating comprises calculating a 3D hand pose using the skeletal position and the center of the hand depth image estimated through the depth hand pose estimator (HPE $F^{E1}$) and the IR hand pose estimator (HPE $f^{E2}$).

6. The hand pose estimation method of claim 1, further comprising:

training the hand image generator (HIG), a hand image discriminator (HID), and two hand pose estimators (HPEs) using a dataset that includes the paired depth and IR images from the IR camera.

7. A hand pose estimation system based on an infrared (IR) camera through domain transfer learning, the hand pose estimation system comprising:

an image processing configured to process a depth image and an IR image for a hand motion a skeleton estimator configured to synthesize a depth map in the IR image using a hand image generator (HIG) and to estimate a skeletal position of a hand joint from each of the depth map and an IR map; and a pose calculator configured to calculate a three-dimensional (3D) hand pose using the skeletal position and a center of a hand depth image.

8. The hand pose estimation system of claim 7, wherein the image processing is configured to segment a hand image in a three-dimensional (3D) bounding box centered on a center of mass (CoM) estimated in the depth image being input, to normalize a depth patch, and to normalize the IR image using the 3D bounding box.

9. The hand pose estimation system of claim 7, wherein the skeleton estimator is configured to estimate a relative skeletal position of the hand joint from a center of a hand in a space of 52 dimensions corresponding to a low dimension, and the pose calculator is configured to reconstruct values mapped to the 52 dimensions estimated by the skeleton estimator to 63 dimensions and to use the center of the hand depth image from a camera coordinate system.

10. The hand pose estimation system of claim 9, wherein the skeleton estimator is configured to infer the skeletal position of the hand joint from the depth map using a depth hand pose estimator (HPE $f^{E1}$) and to estimate the skeletal position of the hand joint from the IR map using an IR hand pose estimator (HPE $F^{E2}$).

11. The hand pose estimation system of claim 10, wherein the pose calculator is configured to calculate a 3D hand pose using the skeletal position and the center of the hand depth image estimated through the depth hand pose estimator (HPE $f^{E1}$) and the IR hand pose estimator (HPE $f^{E2}$).

12. The hand pose estimation system of claim 7, further comprising:

a training unit configured to train the hand image generator (HIG), a hand image discriminator (HID), and two hand pose estimators (HPEs) using a dataset that includes the paired depth and IR images from the IR camera.

* * * * *